United States Patent
Giallorenzi et al

[11] 3,802,761
[45] Apr. 9, 1974

[54] OPTICAL WAVEGUIDE EDGE COUPLER USING GRADED INDEX PROFILE

[75] Inventors: Thomas G. Giallorenzi, Alexandria, Va.; Edward J. West, Silesia, Md.

[73] Assignee: The United States of America as represented by the Secretary of the Navy, Washington, D.C.

[22] Filed: Dec. 7, 1972

[21] Appl. No.: 313,003

[52] U.S. Cl............ 350/96 WG, 65/30, 65/DIG. 7, 350/175 GN
[51] Int. Cl. ............................................. G02b 5/14
[58] Field of Search ................ 350/96 WG, 175 GN

[56] References Cited
UNITED STATES PATENTS
| | | | |
|---|---|---|---|
| 3,647,406 | 3/1972 | Fisher | 350/96 WG X |
| 2,344,250 | 3/1944 | Jones | 350/175 GN UX |
| 3,486,808 | 12/1969 | Hamblen | 350/175 GN |
| 3,746,450 | 7/1973 | Smith | 350/96 WG X |

OTHER PUBLICATIONS

French et al. "Refractive Index Changes Produced in Glass by Ion Exchange" Ceramic Bulletin Vol. 49, No. 11, November 1970, pp. 974–977.
Standley et al. "Properties of Ion-Bombarded Fused Quartz for Integrated Optics" Applied Optics Vol. 11, No. 6, June, 1972, pp. 1,313–1,316.

*Primary Examiner*—John K. Corbin
*Attorney, Agent, or Firm*—R. S. Sciascia; Arthur L. Branning; M. L. Crane

[57] ABSTRACT

An optical radiation waveguide integral with a glass substrate in combination with a coupler for coupling optical radiation into the waveguide. The waveguide and coupler are formed by thermal diffusion of ions in glass and the coupler may be shaped by inserting the glass into the solution a certain distance to form the waveguide with additional insertion of the substrate into the solution for shaping the coupler.

8 Claims, 11 Drawing Figures

PATENTED APR 9 1974 3,802,761

OPTICAL WAVEGUIDE EDGE COUPLER USING GRADED INDEX PROFILE

BACKGROUND OF THE INVENTION

This invention relates to optical waveguides and optical radiation couplers for optical waveguides and more particularly to the combination of an optical coupler and rectangular waveguide formed integral with a substrate.

Herefore, rectangular optical waveguides have been fabricated by securing a glass with a higher index of refraction onto a substrate with a lower index of refraction in air. Other waveguides have been formed by sputtering, ion exchange, ion bombardment, vacuum evaporation, liquid phase epitaxy and plasma polymerization. Sputtered films have been made of different materials which resulted in films with propagation losses of less than 1 db/cm. Polymerized organosilicon films have resulted in low loss films as low as 0.05 db/cm. Ion bombarded films produced in fused silca have resulted in films with 0.2 db/cm losses. Ion exchange has been previously used in the manufacture of low loss optical fibers as well as in the fabrication of planar and three-dimensional waveguides in glass. Sputter type waveguide and couplers have been set forth in a published article: "Experiments on Light Wave in a Thin Tapered Film and a New Light-wave Coupler" by P. K. Tien and R. J. Martin; *Applied Physis Letters*, volume 18, number 9, pages 398–401, May 1, 1971.

SUMMARY OF THE INVENTION

This invention is directed to thin film radiation waveguides and couplers for a rectangular optical waveguide and to a method of forming a thin film optical radiation waveguides and couplers. The optical waveguides and couplers are formed by ion exchange. A thin piece of glass may be inserted into a molten solution containng ions such as $AgNO_3$, $KNO_3$, and $tlNO_3$ wherein the $Ag^+$, $K^+$ or $Tl^+$ ions are exchanged for lighter ions such as $Na^+$ and $Li^+$ in the glass. Therefore, the surface layer in which the ions are exchanged have a higher index of refraction than the glass portion with unexchanged ions to form a waveguide on the surface of the glass substrate. With the glass immersed only partially of its length into the molten solution, a coupler is formed at the area corresponding to the transition region from exchange to unchanged glass. By slowly immersing the glass into the solution after having formed the waveguide, the slope of the coupler may be changed to provide different angular shaped couplers. By two step diffusion, i.e. exchange of $Ag^+$, $K^+$, or $Tl^+$ for $Na^+$ and $Li^+$ followed by an exchange of $Na^+$ and $Li^+$ for $Ag^+$, $K^+$, or $Tl^+$ a buried waveguide may be formed within the substrate. A buried waveguide may also be joined by difusion limiting processes when the waveguide is forced by ion exchange. Throughout the specification, the waveguide is considered to be rectangular.

STATEMENT OF THE OBJECTS

It is therefore an object of the present invention to easily and reproducibly produce optical waveguide edge couplers.

Another object is to provide a method by which uniform optical waveguide edge couplers may be produced.

Still another object is to form an optical waveguide coupler by an ion exchange method.

Yet another object is to form a combined optical coupler and optical waveguide integral with a substrate.

While still another object is to form an optical waveguide within a substrate as a part of the substrate.

Other objects and advantages of the invention will become obvious from a review of the following specification when considered with the drawing.

DESCRIPTION OF THE INVENTION

It is well known that optical radiation waveguides may be created by placing a medium upon a substrate wherein the medium placed upon the substrate has a higher index of refraction than that of the substrate. Also, the index of refraction of the waveguide medium has an index of refraction higher than that of the medium in which the waveguide is placed such as air.

The refractive index of glass is related to both the density of the glass and to the electronic polarizability of the constituent ions within the glass. It has been determined that the index of refraction of glass may be changed by diffusing ions such as $Ag^+$, $K^+$, or $Tl^+$ into the glass replacing lighter ions of $Na^+$ and $Li^+$ which were diffused out of the glass.

Optical radiation waveguides and couplers have been made by use of substrates of similar composition such as a soda-lime silicate glass with minor proportions of MgO and $Al_2O_3$, all giving similar results. Other substrates slightly larger than microscopic slides having the following composition Al~4%, Na~12%, Ca~7%, Mg~2% and Si the major constituent have also been used. Aluminosilicate glasses have been found to be superior to soda-lime glass with the best results produced by ion exchange in molten $AgNO_3$.

Good results of fabricating waveguides and couplers have been obtained by using a substrate glass having the molar composition 12% $Li_2O$, 12% $Na_2O$, 12% $Al_2O_3$, 64% $SiO_2$.

Figure 1:
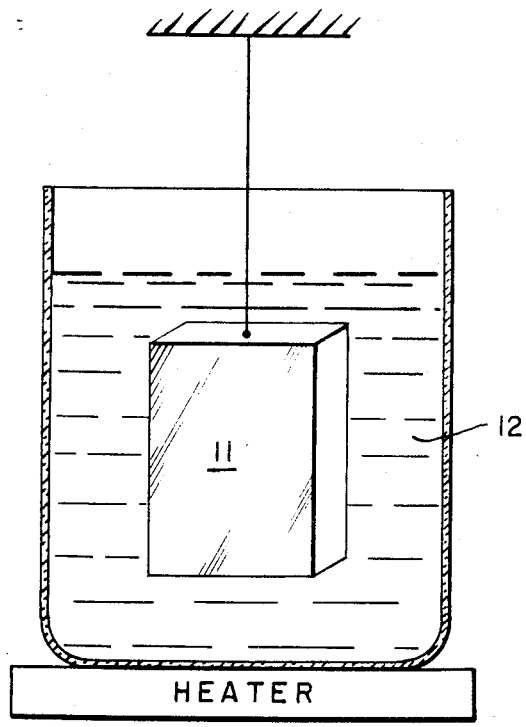
FIG. 1 illustrates a system for forming a waveguide onto a substrate.
Figure 2:
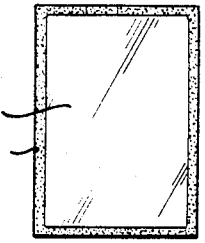
FIG. 2 illustrates the region of ion exchange or waveguide region along the surface of the substrate.

In carrying out the process for fabricating surface layer waveguides on a substrate, the substrate 11 is immersed into a molten solution 12 containing ions to be exchanged in the glass substrate, for example, $AgNO_3$, KNO$_3$, or TlNO$_3$, as shown in FIG. 1. By way of example, the substrate is immersed entirely into a molten solution of AgNO$_3$ having a temperature range of from about 225° C to about 270° C for a period of 24 hours. During the ion exchange, the molten solution is stirred resulting in a surface layer ion exchange depth 13 of from 5$\mu$ to 20$\mu$. During the process, the Ag$^+$ ions diffuse into the surface layer of the substrate as represented in FIG. 2 and the Na$^+$ and Li$^+$ ions diffuse into the solution.

Figure 4:
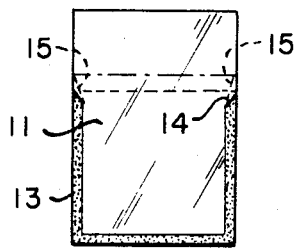
FIG. 4 illustrates the ion exchange region depicting the integral optical waveguide - optical waveguide coupler.
Figure 3:
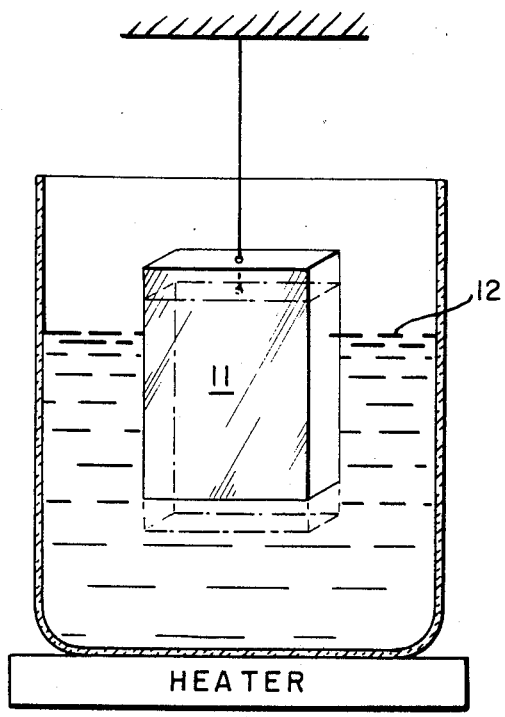
FIG. 3 ilustrates a substrate immersed 75 percent of its length into a molten ion solution to form an optical waveguide - optical waveguide coupler.

In order to fabricate a composite optical waveguide with a tapered optical radiation coupler on a substrate, the same process is followed except that the substrate is immersed only partially for example (75%) into the molten solution containing ions. This is shown by example in FIG. 3. During a partial immersion of the length of the substrate into the molten solution, a transition region of several hundred optical wavelengths long which varies in silver content from that of the waveguide silver concentration to zero concentration is formed. This transition region is tapered in silver concentration thereby forming a tapered waveguide coupler 14 in conjunction with the waveguide as shown by solid line in FIG. 4.

It has been determined that a longer tapered edge may be formed by slowly lowering the substrate into the molten concentration once the waveguide has been formed. During lowering of the substrate, the Ag$^+$ ions diffuse further into the surace and along the tapered waveguide end to form a longer tappered end 15 as shown by dotted lines in FIG. 4. Thus, the slope and length of the optical coupler may be controlled and produced with a desired slope.

Figure 5:
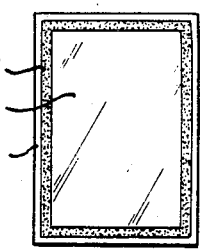
FIG. 5 illustrates a waveguide buried beneath a surface layer of the substrate.

In the above discussion surface waveguides and/or waveguide-couplers have been discussed. It has been determined that the process may be expanded to form optical waveguides below the surface as shown in FIG. 5. Such waveguides may be made by two different methods. A substrate 11 is placed into a molten solution 12 of ions just as explained previously to form surface waveguides and/or waveguide - waveguide couplers. In one method, the substrate with the previously formed integral surface waveguide is immersed into a bath or solution of NaNO$_3$ in order to deplete the surface layer 16 of silver. in surface silver ions exchange with the sodium ions n the bath. The exchange is from the outer surface inwardly. Thus, the surface silver ions are depleted while the sodium ions diffuse into the surface layer of the substrate. Therefore, a layer of silver ions remain within the body of the substrate sandwiched between the main substrate body and the surface layer 16 on the outside of the silver layer within the body. It has been determined that the surface area of a previously formed silver waveguide may be depleted sufficiently to form an internal waveguide by immersing the substrate-waveguide into a NaNO$_3$ bath at a temperature of 225° for a period of 4 hours.

A second method of forming a buried silver waveguide within the body of a substrate is to immerse the substrate into an unstirred molten solution of AgNO$_3$ maintained at a temperature of 225° C fr a period of 24 hours. During this time, the sodium ions migrate out of the substrate while the silver ions migrate into the substrate replacing the sodium ions. Due to the fact that the molten solution is not stirred, the outer layer of silver ions are depleted and replaced by sodium ions thereby leaving a layer of silver ions buried within the body of the substrate about 6 microns from the outer surface.

Since buried waveguides are removed from the glass air interface, and because of its graded index profile, such waveguides have low propagation losses since surface scattering will be reduced.

As explained above a waveguide coupler may be formed by immersing the substrate about 75 percent of its length into a molten solution of ions where a tapered exist exis between the waveguide in the dipped portion and the unchanged substrate above the dipped portion. The above method for forming buried waveguides may be followed to produce waveguide-waveguide couplers that are buried below the surface of the substrate.

It has been determined that thermal ion exchange index change of AgNO$_3$ is much greater than that of KNO$_3$. Each of these are much greater than TlNO$_3$. The following table lists the measured indices of refraction for the propagating waveguide modes formed by dipping the substrate in a stirred bath of molten ion change solution for 24 hours.

| Mode | Effective Index of Refraction | |
|---|---|---|
| $m =$ | $\beta/k$ (TE mode) | $\beta/k$ (TM mode) |
| 0 | 1.601 | 1.602 |
| 1 | 1.5894 | 1.5901 |
| 2 | 1.5792 | 1.5794 |
| 3 | 1.5697 | 1.5706 |
| Ag$^+$ | | |
| 4 | 1.5604 | 1.5614 |
| 5 | 1.5507 | 1.5514 |
| 6 | 1.5406 | 1.5419 |
| 7 | 1.5309 | 1.5313 |
| K$^+$ | | |
| 0 | 1.5255 | 1.5260 |

The glass substrate used in the above index of refraction examples for AgNO$_3$ was "STARLUX" having the following chemical composition Al~4%, Na~12%, Ca~8%, Mg~2% and Si the major constituent, manufactured by A.S.T. Industries Kingport, Tennessee. The glass used for K$^+$ was a special "Anchor Hocking" glass having the following composition: 12% Li$_2$O, 12% Na$_2$O, 12% Al$_2$O$_3$, 64% SiO$_2$. Thallium$^+$ exchange for 24 hours dipping periods at 250° C did not produce good reproducible waveguides and have not been shown.

Figures 6A, 6B:
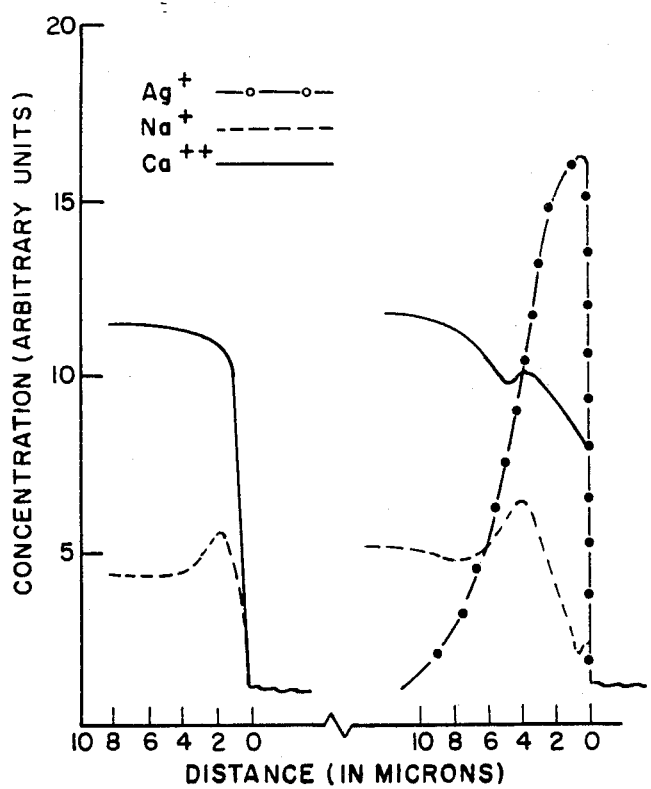
FIGS. 6a and 6b illustrate the ion exchange profiles created in stirred $AgNO_3$ baths.

FIGS. 6(a) and 6(b) illustrate the ion exchange profiles created in stirred AgNO$_3$ baths. In FIG. 6(a) the calcium an sodium profiles in an untreated "STARLUX" substrate are shown. FIG. 6(b) illustrates the silver, sodium and calcium profiles in 24 hour dipped substrates with the AgNO$_3$ bath maintained at 225° C.

Figures 7A, 7B, 7C:
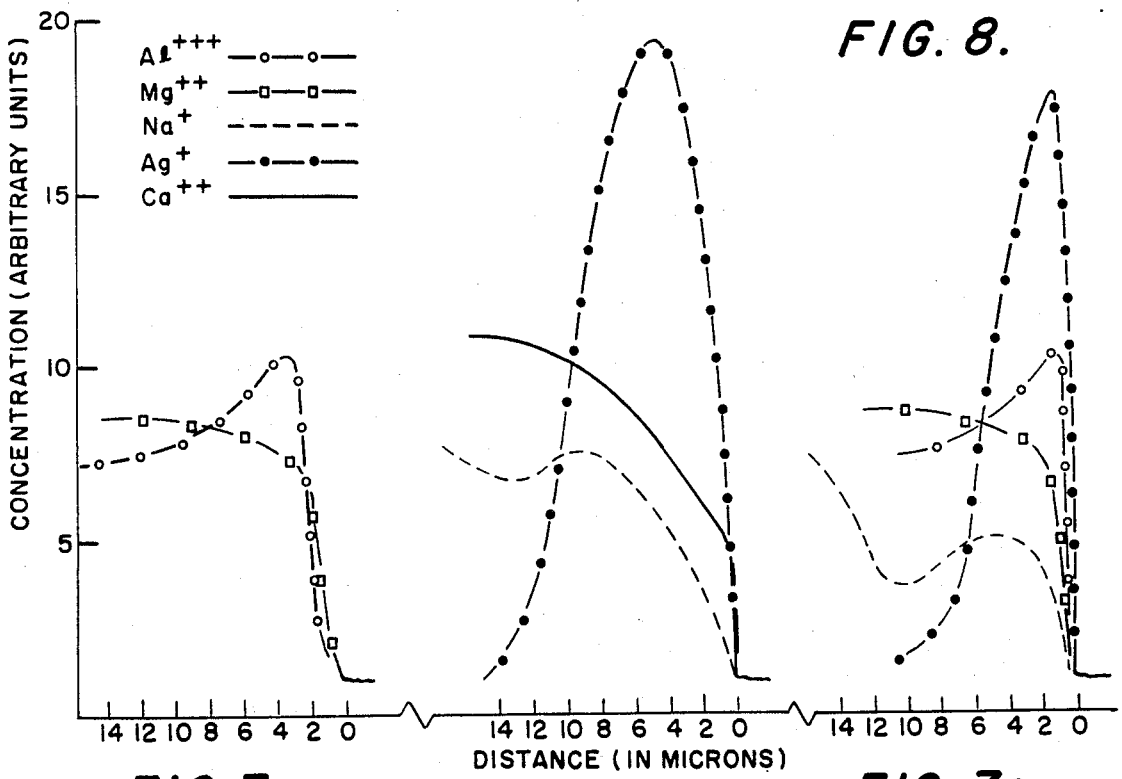
FIGS. 7a, b, and c illustrate the ion exchange profiles created in unstirred $AgNO_3$ baths.

FIGS. 7a, b, and c illustrate the ion exchange profile created in unstirred AnNO$_3$ baths. FIG. 7a presents the Al$^{+++}$ and Mg$^{++}$ profiles in an untreated "STARLUX" substrate. FIGS. 7b and 7c, the peak of the silver profiles are shown displaced in toward the substrate interior as discussed previously for forming waveguides buried within the interior of a substrate. Temperature and time same as above for FIGS. 6a and b.

Figure 8:
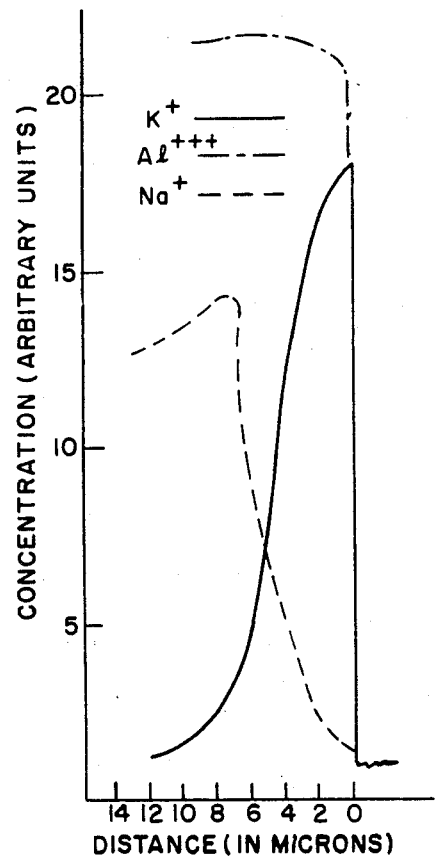
FIG. 8 illustrates the ion exchange profile for a stirred $KNO_3$ bath.

FIG. 8 illustrates the ion exchange profile for a stirred KNO$_3$ bath with a temperature of 365° C for a period of 24 hours.

The optical waveguides made in accordance with the principles of this invention are reproducible and are of low loss. Losses of 0.1 db/cm have been measured. Silver exchanged waveguides have been found to degrade in performance with time with degradation accompanied by a discoloring of the waveguide surface. However, treatment with $HNO_3$ has been found to restore such waveguides to their original performance. Good waveguides with loss less than 0.5 db/cm do not degrade nor could degradation be promoted by exposure to intense ultraviolet radiation.

Obviously many modifications and variations of the present invention are possible in the light of the above teachings. It is therefore to be understood that within the scope of the appended claims the invevention may be practiced otherwise than as specifically described.

What is claimed is:

1. An optical rectangular waveguide, comprises:
a rectanguar glass substrate;
a layer of ions diffused into each surface of said rectangular substrate along only a portion of the length thereof forming an optical rectanglar waveguide;
said diffused ion layer including a tapered edge at the end of said layer extending along the length of said substrate to provide an optical radiation coupler for said waveguide.

2. An optical waveguide as claimed in claim 1 wherein;
said diffused ions are selected from a group consisting of silver, potassium and thallium.

3. An optical waveguide as claimed in claim 1, wherein;
said layer of ions diffused into said substrate are silver.

4. An optical waveguide as claimed in claim 3, wherein;
said layer of silver ions diffused into said substrate are along the surface of said substrate.

5. An optical waveguide as claimed in claim 4, wherein;
the thickness of said layer of silver ions is from 0.5 – 20 microns.

6. An optical waveguide as claimed in claim 3, wherein; said layer of silver ions ar buried beneath the surface of said substrate.

7. An optical waveguide as claimed in claim 1, wherein; said layer of ions diffused into said substrate are potassium.

8. An optical waveguide as claimed in claim 1, wherein; said layer of ions diffused into said substrate are Thallium.

* * * * *